US011532099B2

(12) United States Patent
Biemer et al.

(10) Patent No.: US 11,532,099 B2
(45) Date of Patent: Dec. 20, 2022

(54) METHOD AND SYSTEM FOR COMPILING PERFORMANCE METRICS FOR RACING COMPETITORS

(71) Applicant: BetMIX, LLC, Hunt Valley, MD (US)

(72) Inventors: Garrett Biemer, Boston, MA (US); Paul Williams, Hollywood, FL (US)

(73) Assignee: BetMIX, LLC, Hunt Valley, MD (US)

( * ) Notice: Subject to any disclaimer, the term of this patent is extended or adjusted under 35 U.S.C. 154(b) by 38 days.

(21) Appl. No.: 17/166,236

(22) Filed: Feb. 3, 2021

(65) Prior Publication Data

US 2022/0245853 A1 Aug. 4, 2022

(51) Int. Cl.
| | |
|---|---|
| *G06T 7/73* | (2017.01) |
| *G06T 7/80* | (2017.01) |
| *G06T 7/00* | (2017.01) |
| *G06T 7/285* | (2017.01) |

(52) U.S. Cl.
CPC ............... *G06T 7/73* (2017.01); *G06T 7/285* (2017.01); *G06T 7/80* (2017.01); *G06T 7/97* (2017.01); *G06T 2207/10016* (2013.01); *G06T 2207/20081* (2013.01); *G06T 2207/20084* (2013.01); *G06T 2207/30221* (2013.01); *G06T 2207/30244* (2013.01)

(58) Field of Classification Search
CPC .. G06T 7/73; G06T 7/80; G06T 7/285; G06T 7/97; G06T 2207/20081; G06T 2207/20084; G06T 2207/30221; G06T 2207/30244
See application file for complete search history.

(56) References Cited

U.S. PATENT DOCUMENTS

| | | | |
|---|---|---|---|
| 6,795,567 B1 | 9/2004 | Cham et al. | |
| 7,620,204 B2 | 11/2009 | Porikli et al. | |
| 8,306,267 B1 | 11/2012 | Gossweiler, III et al. | |
| 8,565,481 B1 | 10/2013 | Smith | |
| 9,710,716 B2 | 7/2017 | Case et al. | |
| 10,201,752 B2 | 2/2019 | Lucey et al. | |
| 10,204,300 B2 | 2/2019 | Lucey et al. | |
| 10,824,918 B2 | 11/2020 | Felsen et al. | |
| 2017/0302970 A1* | 10/2017 | Dudko | H04N 7/181 |
| 2018/0341812 A1* | 11/2018 | Floor | G06V 20/52 |
| 2020/0279114 A1 | 9/2020 | Sha et al. | |
| 2020/0279115 A1 | 9/2020 | Sha et al. | |
| 2020/0279131 A1 | 9/2020 | Sha et al. | |
| 2020/0279398 A1 | 9/2020 | Sha et al. | |
| 2020/0404174 A1* | 12/2020 | Taxbøl | H04N 5/23238 |

* cited by examiner

*Primary Examiner* — Vu Le
*Assistant Examiner* — Tracy Mangialaschi
(74) *Attorney, Agent, or Firm* — Larry J. Guffey; Oliver & Grimsley, LLC (57) ABSTRACT

A method of compiling performance metrics for racing competitors by analyzing videos of the competitors' prior races, includes determining: (a) the GPS coordinates of race track landmarks that appear in the videos, (b) within each of the videos' images, the position and orientation of a part for each of the competitors, (c) for each of the videos' images, the camera's extrinsic and intrinsic parameters, (d) the path of each of the competitors from the race's starting line to its finish line, (e) for each of the videos' images, the GPS coordinates of the part for each of the competitors, and (f) using the camera's frame rate, the performance metrics for each of the racing competitors.

20 Claims, 10 Drawing Sheets

METHOD AND SYSTEM FOR COMPILING PERFORMANCE METRICS FOR RACING COMPETITORS

BACKGROUND OF THE INVENTION

1. Field of the Invention

The present invention generally relates to devices, systems and methods that use computer vision technology to detect, track and mathematically characterize the motion of objects seen in digital videos.

More specifically, the present invention relates to racing (e.g., horse racing, harness racing, NASCAR racing), and is directed to a means for analyzing the digital video data of races around a race track to compute the performance metrics (e.g., speed exhibited during various portions of a race) that various competitors have exhibited during their prior races, training sessions or even a current race. Such performance metrics can be used by potential wagerers or bettors to help their efforts to handicap current or upcoming races in which these racing competitors will be competing.

2. Description of the Related Art

The computation and distribution of the performance metrics or handicapping factors for competitors is an important part of track racing. This situation exists because of the enjoyment that many who wager on races obtain from being able to use such performance metrics to try to handicap the races on which they are wagering.

Considerate effort in the racing industry has always been, and continues to be, devoted to compiling the performance metrics of the competitors that compete in track racing. Such compilation efforts have historically involved the manual, visual assessment and analysis of the video records of the many races that have been conducted within the racing industry.

Recent advancements in computer vision technology for detecting and tracking the motion of objects in space have resulted in this technology's application to analyze sports videos for the purpose of deriving information that can be used to improve the performance of individual sportsmen or sports teams. See for example the following U.S. Pat. Nos. 10,201,752; 10,204,300; 10,824,918 and U.S. Patent Publications Nos. (USPPNs) 2020/0279131; 2020/0279115; 2020/0279114, and 2020/0279398.

Examples of these advancements in computer vision technology are found in U.S. Pat. Nos. 9,710,716, 8,565,481, 8,306,267, 7,620,204 and 6,795,567.

Despite these advancements, there is still a need for more efficient and less labor-intensive ways to compile the performance metrics for racing competitors. The present invention seeks to provide the methods, systems and devices for enabling computer vision technology, without the use of any other, during-the-race-collected, competitor data, to be used to analyze the race videos of competitors to determine their desired performance metrics.

SUMMARY OF THE INVENTION

Recognizing the need for the development of more efficient and less labor-intensive ways to compile the performance metrics of racing competitors, the present invention seeks to provide the methods, systems and devices for analyzing the video images of races to compile such performance metrics.

In accordance with a preferred embodiment of the present invention, a method of compiling horse performance metrics by analyzing broadcast videos, recorded with a fixed-location Pan-Tilt-Zoom (PTZ) camera, of the competitors' prior races, on racetracks having landmarks on the track that appear in the video, includes determining: (a) the GPS coordinates of the landmarks and storing them in a race track initialization database, (b) within each of the video's images, the position and orientation of a part for each of the competitors, (c) the PTZ camera's extrinsic and intrinsic parameters at each of the instances when each of the images was taken, (d) using the identified position and orientation of the part for each of the racing competitors in each of the images, the path of each competitor from the race's starting line to its finish line, (e) the GPS coordinates of the part for each of the competitors in each of the images, and (f) using the part GPS coordinates for each of the competitors in each of the images and the camera's frame rate, the desired performance metrics for each of the competitors.

In accordance with another version of this preferred embodiment of the present invention, a system for compiling the performance metrics for racing competitors, by analyzing the videos of their races which were recorded with a fixed-location Pan-Tilt-Zoom (PTZ) camera on racetracks having landmarks that appear in the video, includes: (a) a race track initialization module that obtains the GPS or real-world coordinates of the race track's landmarks and stores them in a race track initialization database, (b) a racing competitor detection module that detects within each of the video's series of images the position and orientation of a part for each of the competitors, (c) a camera calibration module that determines the extrinsic and intrinsic parameters of the PTZ camera at each of the instances when each of the series of images was taken, (d) a racing competitor tracking module that determines the path around the race track for coordinates of the detected part for each of the racing competitors in each of the series of images, and (f) a performance metrics module that uses a competitor's determined path in terms of its GPS coordinates and the camera's frame rate to determine the desired performance metrics.

Thus, there has been summarized above (rather broadly and understanding that there are other versions of the preferred embodiment which have not been summarized above) the present invention in order that the detailed description that follows may be better understood and appreciated.

DESCRIPTION OF THE PREFERRED EMBODIMENT

Before explaining at least one embodiment of the present invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

Various aspects, advantages, features and embodiments are included in the following description of exemplary examples thereof, which description should be taken in conjunction with the accompanying drawings. All patents, patent applications, articles, other publications, documents and things referenced herein are hereby incorporated herein by this reference in their entirety for all purposes. To the extent of any inconsistency or conflict in the definition or use of terms between any of the incorporated publications, documents or things and the present application, those of the present application shall prevail.

Shown below are examples of some of the various performance metrics for competitors (in this instance, racehorses) that we would like to compute from analyzing the video of races in which the competitors were competing. For each of the competitors, we'd like to compute its:

Position on the racetrack at every moment of the race, i.e., its path around the race track, Average velocity over various segments of the race, Acceleration exhibited at various moments of the race, Path traversed by the competitor in going around the track, Stride length exhibited at various moments or over various segments of the race, Finish order/position, and Finish time.

Figure 1:
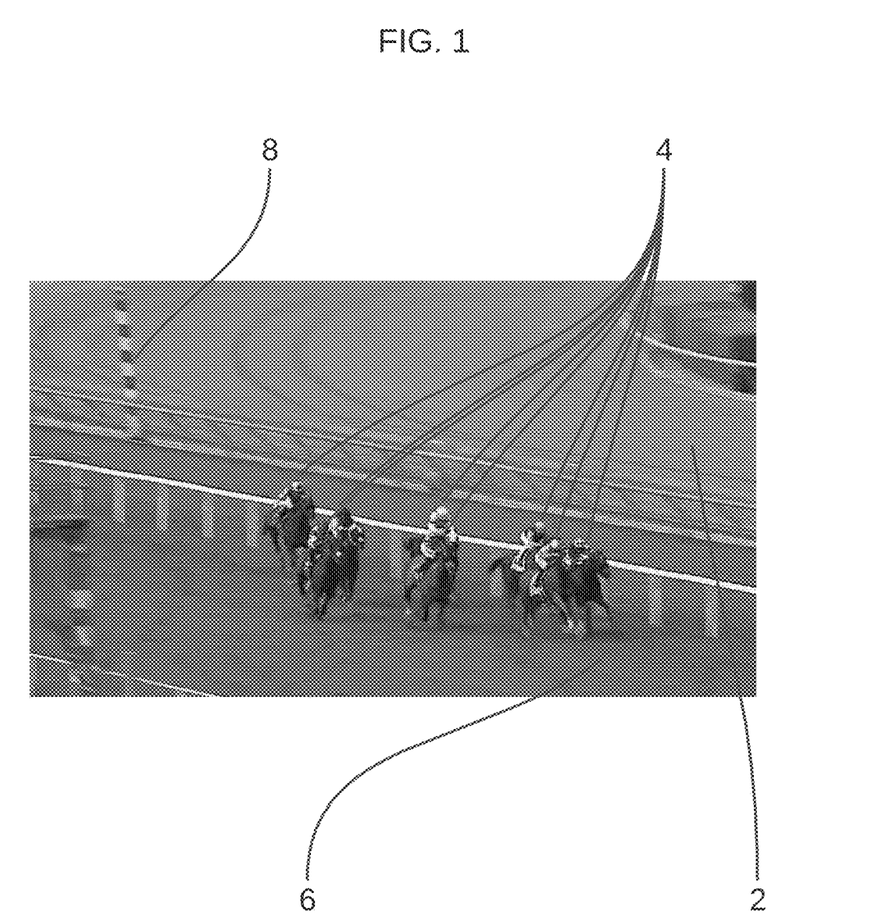
FIG. 1 is an example of an image from a horse race video that we'd like to analyze using a man-hour saving, automated process to calculate various performance metrics for the racehorses shown in this and the other frames that comprise the video record of this horse race.

Shown in FIG. 1 is an example of an image 2 from a horse race video that we'd like to analyze using computer vision technology to calculate one or all of the above performance metrics for the racehorses 4 shown in this and the other series of frames that comprise the video of this horse race. From viewing this image, it is obvious that there are many obvious technical challenges that one must overcome in order to be able to identify and track the various competitors in this video and then to calculate their desired performance metrics.

Some of the technical challenges confronted in the computer vision technology task of developing systems for identifying and tracking an object across a series of video images can be found in the previously incorporated by reference U.S. Pat. No. 9,710,716. Also found therein is the structure for a computer vision system for detecting and tracking objects in a steam of video, which includes "software, hardware, firmware, or various combinations of these. For example, the vision data interface could be an ASIC and the other elements implemented as software on a processor, with the whole system combined with other needed circuitry (power supply and so on) in single physical surveillance unit." It is also note therein that the structure for this system would include a memory.

Once this identifying and tracking task has been accomplished, we're confronted with the technical challenge of determining the competitors' desired performance metrics. For example, to express such desired metrics as a competitor's velocity and acceleration at any instant during the videoed race, we need to be able to convert the competitor's positions in the video frames to real-world locations and thereby provide these images with a real-world length scale in which metrics like velocity and acceleration can be expressed.

Figure 2:
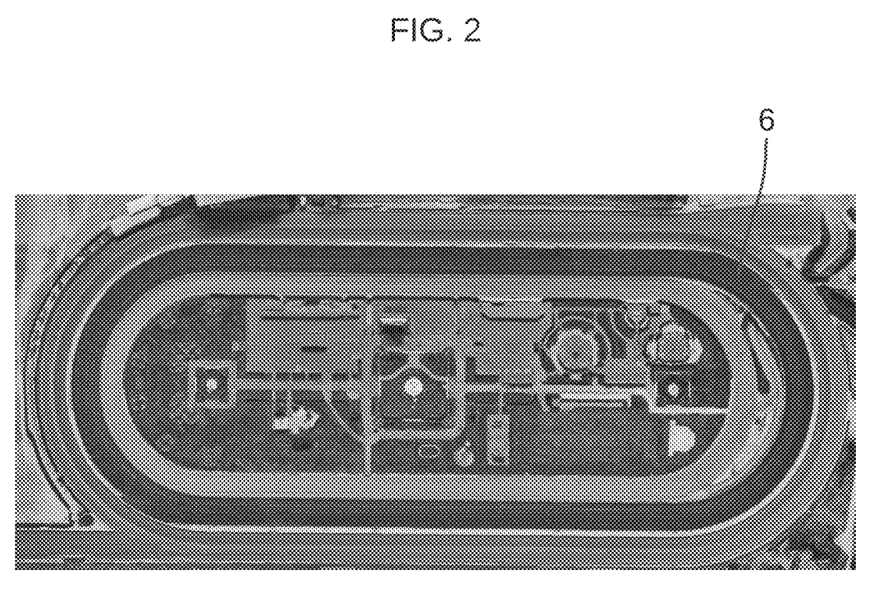
FIG. 2 is an aerial view of the typical oval-shaped, race track on which a large range of races are conducted in North America.

Fortunately, most racing tracks 6, like those shown in FIGS. 1 and 2, and the races that are conducted on them have certain characteristics that prove to be very helpful to our analysis efforts. These include: (i) landmarks 8 (e.g., for horse racing, colored poles on the perimeter of the race track) that appear in the video's series of images and tell us something about the size of the race track on which the race is being conducted (e.g., the distance between black poles represents 1/16th of a mile, green poles 1/8th of a mile, and red poles indicate 1/4 mile fractions), (ii) individual races have a fixed number of competitors, a starting line and a finish line, and include assigning each of the competitors a starting position which serves to establish, for each of the competitors, an identifying name and mark, (iii) races on tracks are typically broadcast and recorded by using one or more Pan-Tilt-Zoom (PTZ) or other suitable cameras (e.g., an array of suitable, fixed field of view cameras), having specified frame rates, that are situated at fixed locations on the race track on which the race is being database that can be accessed on demand.

Figure 3:
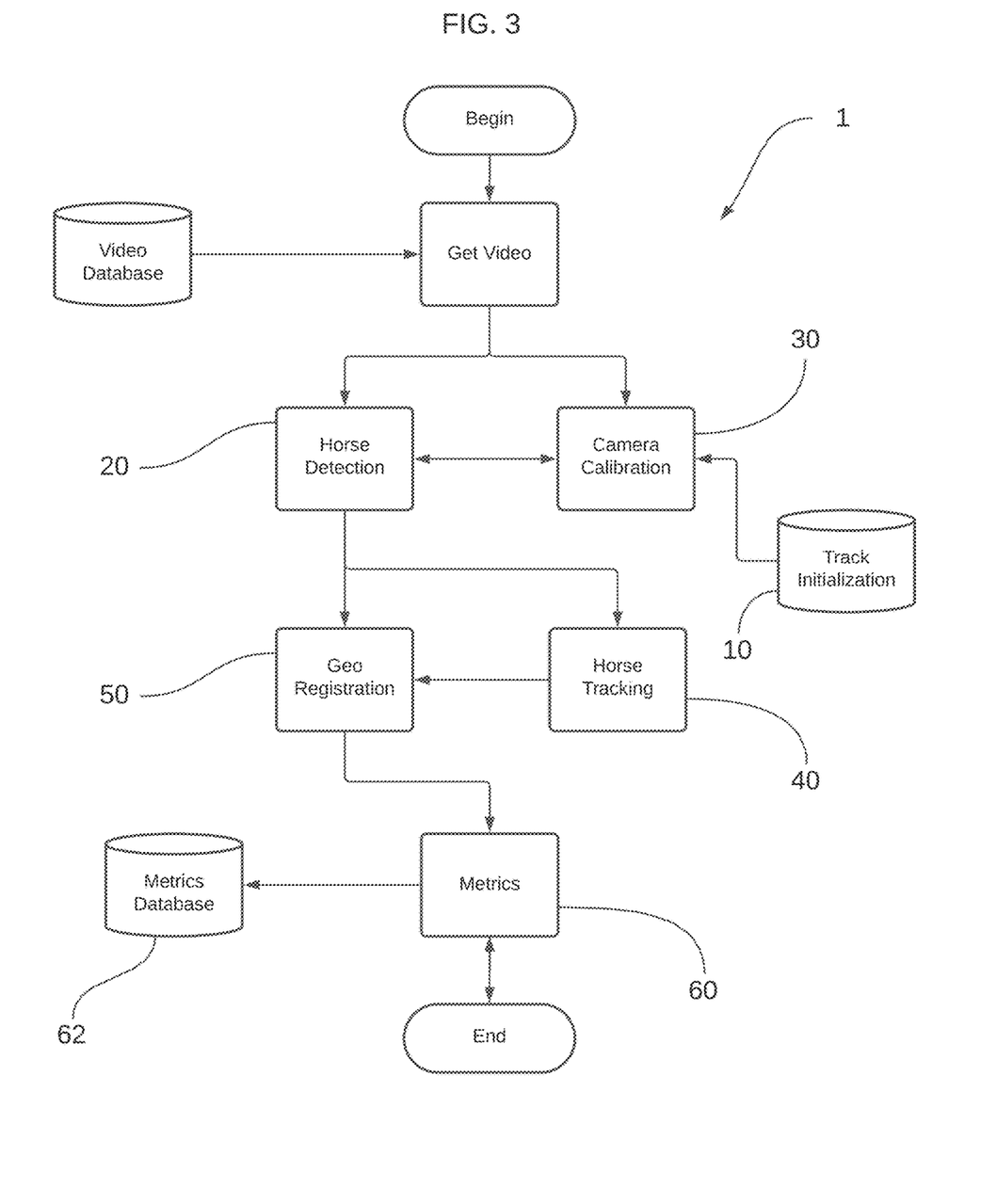
FIG. 3 is a block diagram that illustrates the general elements for a preferred embodiment of a system of the present invention which analyzes the video record of prior races to compute the desired performance metrics for the racing competitors.

Shown in FIG. 3 is a block diagram that illustrates the elements of a preferred embodiment of the present invention 1 which utilizes especially configured software to analyzes the race videos of the competitors to compute their performance metrics. The key elements in this system are seen to include: (a) a race track initialization module 10 that obtains the GPS or real-world coordinates of the race track's landmarks 2 and stores them in a race track initialization database, (b) a competitor detection module 20 which detects within each of the video's series of images the position and orientation of a part or body part 4a-4i for each of the competitors, (c) a camera calibration module 30 that determines the parameters or extrinsic (pose) and intrinsic (zoom) parameters of the PTZ camera at each of the instances when each of the series of images or frames was taken, (d) a competitor tracking module 40 which determines the path around the race track for each of the racing competitors, (e) a GPS registration module 50 that determines the GPS coordinates of the determined body part for each of the competitors in each of the series of images, and (f) a performance metrics module 60, that uses a competitor's determined path in terms of its GPS coordinates and the camera's frame rate to determine the desired performance metrics and stores them in a competitor performance metrics database 62.

To compile the performance metrics for one of the competitors shown in FIG. 1, the system of the present invention begins by analyzing all of the series of images of the video that is represented by the selected frame which is shown in FIG. 1. The result of this analysis is actually the selected competitor's exhibited performance metrics for the single race that was recorded on the analyzed video. Since we want to average the selected competitor's performance over a representative number of races, we could then select from our race video database other races in which the selected competitor competed and similarly analyze the selected competitor's performance in these additional race videos. We could then average our results from all the race videos analyzed to yield the selected competitor's average performance metrics over a representative number of races.

In actuality, the present invention compiles the performance metrics for all of the competitors that were competing in a selected race. It then selects a second race and repeats this video analysis process thereby yielding a set of performance metrics for the competitors that were competing in this second selected race. If we repeat this video analysis enough times, we eventually get to the point where we begin to get a $2^{nd}$, $3^{rd}$, $4^{th}$, etc. set of performance metrics for one or more of the competitors. For each of the individual competitors, we can then average those sets of performance metrics that are applicable to a selected individual competitor to find our desired, competitor's average performance metrics over a selected set of races.

Once a race video has been retrieved for analysis and its data has been conditioned into a format or formats conducive for vision computing, the present invention begins this analysis by the system's race track initialization module 10 initializing the race track which is shown in the retrieved video. This initialization allows the system to understand the real-world, geographic layout of the race track. The initialization process itself usually entails acquiring from a third-party or external provider the GPS coordinates of the landmarks 8 that are seen in the race's video. This GPS information is then stored in a race track initialization database.

Figure 4:
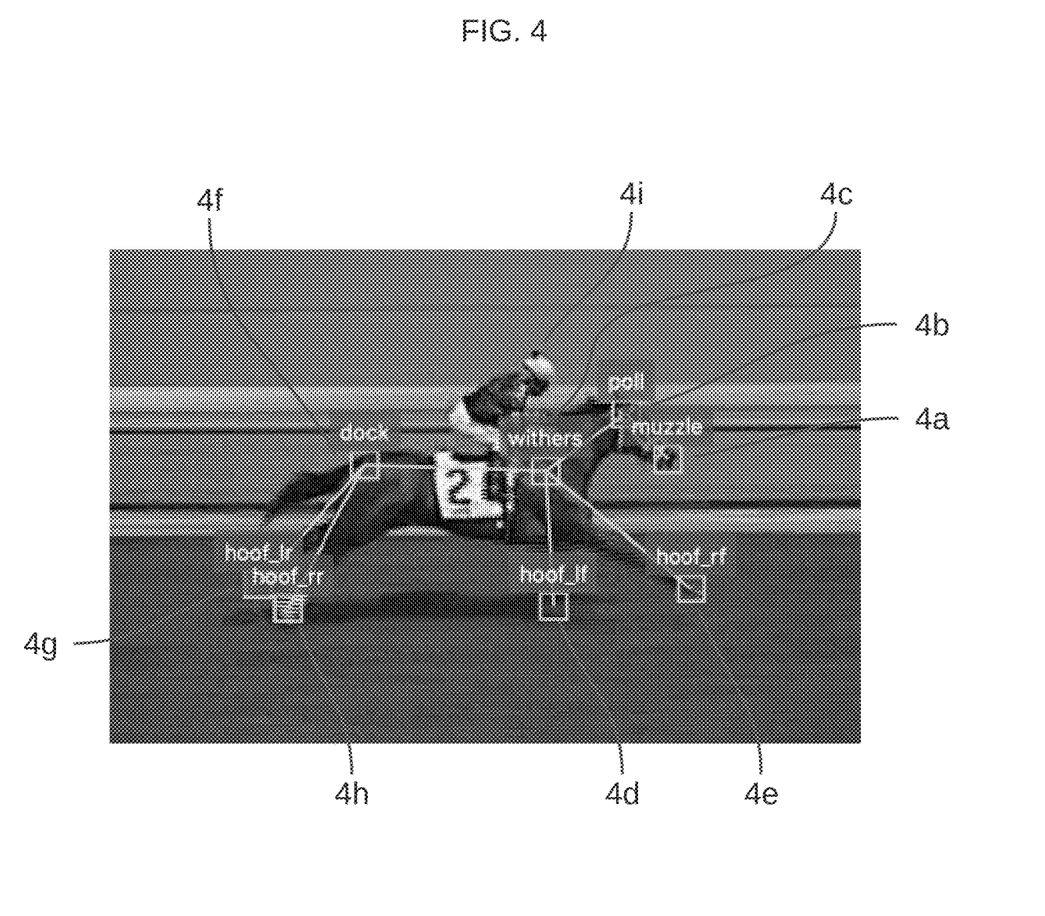
FIG. 4 shows examples of a competitor's (in this instance a racehorse) body parts that may be tracked to determine its orientation or pose in the various series of images that comprise the race video.
Figure 5:
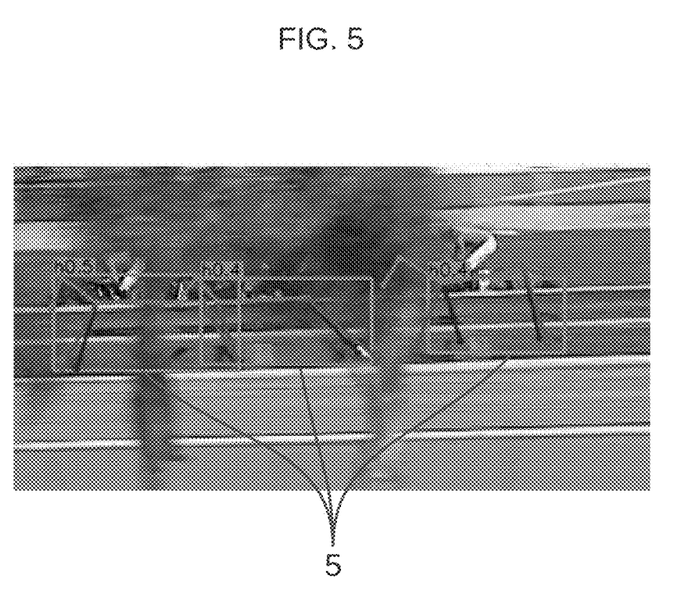
FIG. 5 shows examples of the types of bounding boxes that may be tracked to determine a competitor's path around the race track.

The system's competitor detection module 20 then begins the process of using computer vision technology to analyze and detect within each of the race video's series of images where each of competitors are positioned within each of these images, i.e., the position and orientation or pose of one or more body parts 4a-4i for each of the racing competitors. For a racehorse, examples of such body parts include eight key points on the racehorse and one key point on its jockey: Muzzle 4a, Poll 4b, Withers 4c, Left Front Hoof 4d, Right Front Hoof 4e, Dock 4f, Left Rear Hoof 4g, Right Rear Hoof 4h, and Top of Jockey's Head 4i. The general position of a racehorse or competitor within a frame or image is identified by enclosing it within a bounding box 5. See FIGS. 4 and 5.

Figure 6:
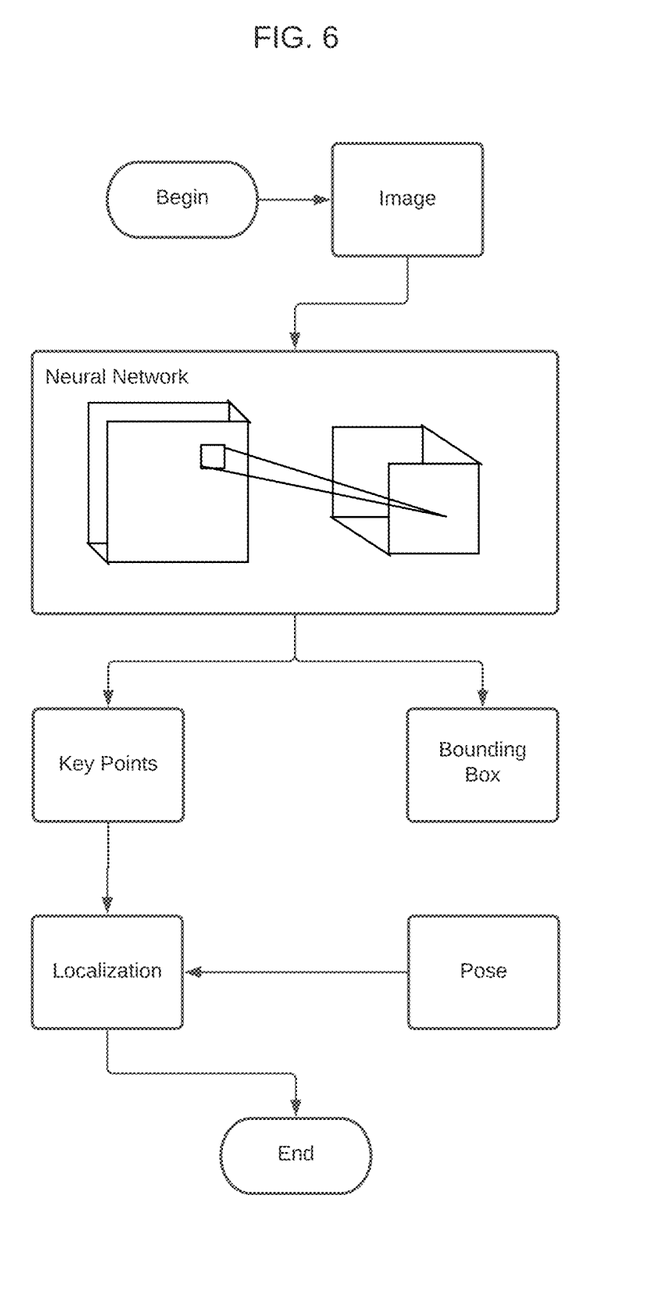
FIG. 6 illustrates the process used by the competitor's detection module to analyze and detect, within each of the race video's series of images, where each of the competitors are positioned within each of these images, i.e., the position and orientation or pose of one or more body parts for each of the racing competitors.

These system outputs, 4a-4i and 5, for this competitor detection module 20 are yielded by processing the series of video images through a convolutional neural network that has been trained or optimized to identify the positions of the various competitors in the images and various key points on the racehorses. See FIG. 6.

To be able to utilize the competitor detection module's outputs to determine the desired performance metrics for the competitors, we need to be able to relate this competitor position and orientation information for the individual images or frames to real-world locations, i.e., we need to be able to understand the full depth of field of the image and determine the positions of each of the competitors on the actual, real-world track. One way to accomplish this would be by knowing the extrinsic & intrinsic parameters of the utilized PTZ camera at the moment it captured each of the images and then making use of the known locations of the static landmarks that appear in our images.

Figure 7:
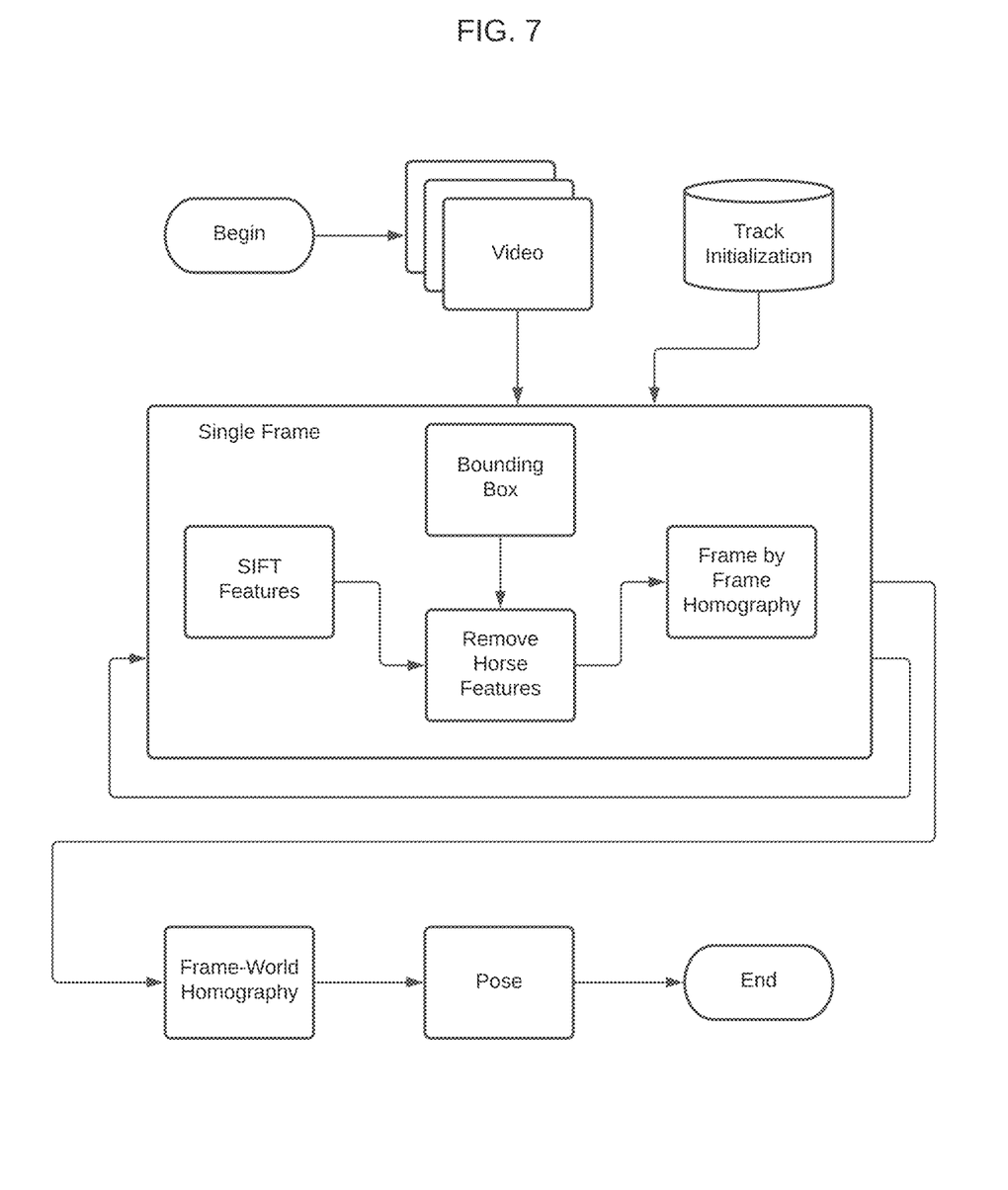
FIG. 7 illustrates the process used by the camera calibration module to determine the extrinsic (pose) and intrinsic (zoom) parameters of the utilized PTZ camera at each of the instances when each of the video's series of images or frames was taken.

To determines the extrinsic (pose) and intrinsic (zoom) parameters of the PTZ camera at the instances when each of the series of images or frames was taken, we utilize the system's camera calibration module 30. The process used by the system's camera calibration module is illustrated in FIG. 7. See also Lu, Chen & Little, "Pan-tilt-zoom SLAM for Sports Videos," 30th British Machine Vision Conference, Cardiff Univ., Cardiff, UK, 2019, published online at https://bmvc2019.org/wp-content/uploads/papers/0329-paper.pdf, for background information on the technical approach employed by our camera calibration module.

This process involves determining the frame by frame homography of our video. We begin this process by identifying the SIFT (Scale-Invariant Feature Transform) features or landmarks within each of the images. Utilizing the outputs of our competitor detection module, any SIFT features identified within our bounding boxes are removed (i.e. non-stationary key points). Next, the remaining SIFT features are matched between the frames to determine the desired frame by frame homography of our video. This information allows us to estimate the extrinsics and intrinsics of the utilized PTZ camera.

Figure 8:
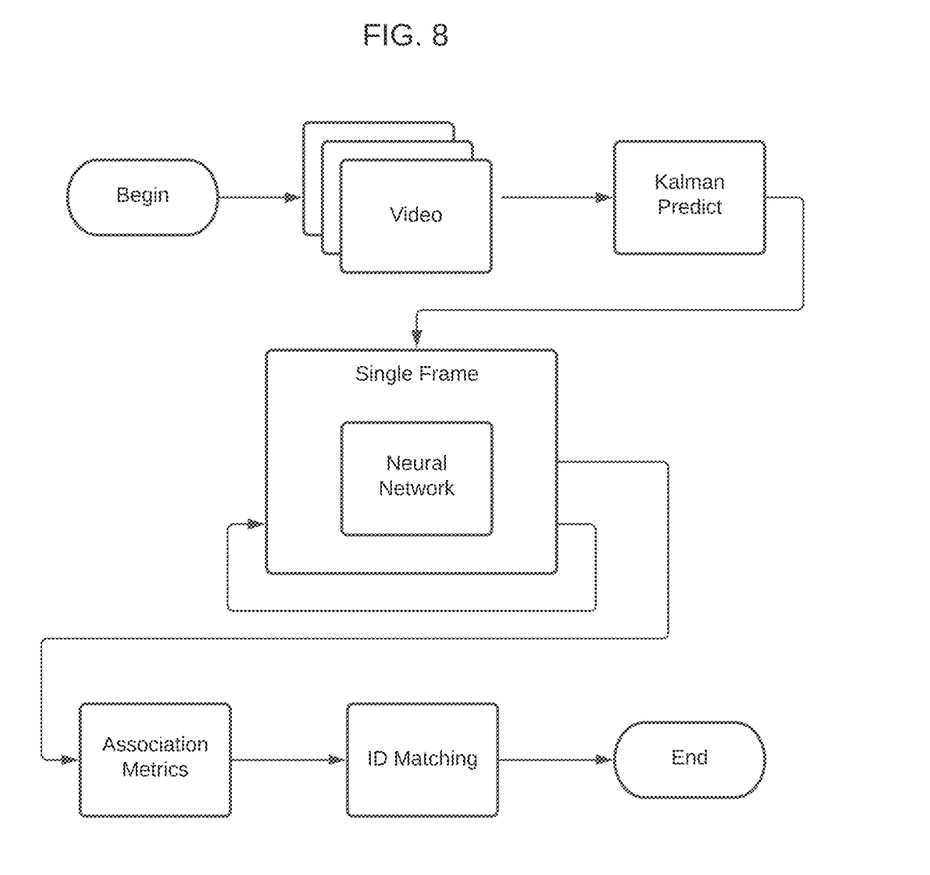
FIG. 8 illustrates the process used by the competitors' tracking module to determine the identity of each of the competitors that are seen in a frame so the paths of the individual competitors can be tracked during a race.

Knowing the camera's the extrinsics and intrinsics, we can now utilize the outputs of our competitor detection module (i.e., a competitor's location and orientation within a frame) to begin, in the system's GPS registration module, to express this information in terms of the real-world coordinates that we will need in order to be able to compute the competitors desired performance metrics.
seen in a frame so the paths of the individual competitors can be tracked during a race is accomplished by the system's competitor tracking module 40. The process used by this module is illustrated in FIG. 8. Background information on this process can be found in Wojke, Bewley & Paulus, "Simple Online and Realtime Tracking With A Deep Association Metric," Mar. 21, 2017, Cornell Univ. Computer Vision, 1703.07402 which can be found online at https://arxiv.org/pdf/1703.07402.pdf and Wojke & Bewley, "Deep Cosine Metric Learning For Person Re-Identification," Dec. 2, 2018, Cornell Univ. Computer Vision, 1812.00442 which can be found online at https://arxiv.org/pdf/1812.00442.pdf.

To determine the path around the race track for any of the racing competitors, we need to be able to identify the competitor, which we wish to track, in each of the video's series of images or frames. To accomplish this identification task, the competitor tracking module utilizes Kalman Filters to provide a probability distribution or prediction of where the competitor that is being tracked is likely to be positioned in a subsequent frame.

Utilizing the competitor detection module's neural network, we are able to derive a lower dimensional representation (i.e., appearance vector) for each competitor which we wish to track. We can then compare the appearance vector in the current frame to known objects in the prior frame and wherein we know that objects more similar to known objects are more likely to be that known object.

Combining the two parameters above in a weighted sum allows us to combine the knowledge of: i) where the competitor is likely to be, and ii) which competitor looks most a known competitor that was seen in a prior frame. These parameters are then represented in a N×M matrix with N representing the known objects from a prior frame and M representing the unknown objects in the current frame. From there, we are able to leverage the Hungarian Algorithm to associate the known objects from prior frames to the unknown objects in the current frame.

Track racing presents some rather unique challenges to the technical approach of the present invention. For example, during a race the images of the various competitors in a frame tend to stack on top of one another, or overlap, and thereby make it difficult to tell where the image of one competitor starts and another begins. Additionally, if during the race a competitor drops far behind the other competitors, it will go out of the recording camera's range of view. Also, the race track itself may be full of objects that occlude the camera's view of the competitors for some periods of time.

These challenges required some modifications to our general computer vision approach, including, but not limited to: a) varying the weighted sum of distances for objects we that went temporarily out of the camera's range of view, b) making forecasts on where multiple points on the competitors are likely to be in future frames, c) projecting those forecasts into three dimensional space, and d) utilizing known facts about the race track and racing in general to infer where a competitor is likely to be in an upcoming frame that is to be analyzed.

Figure 9:
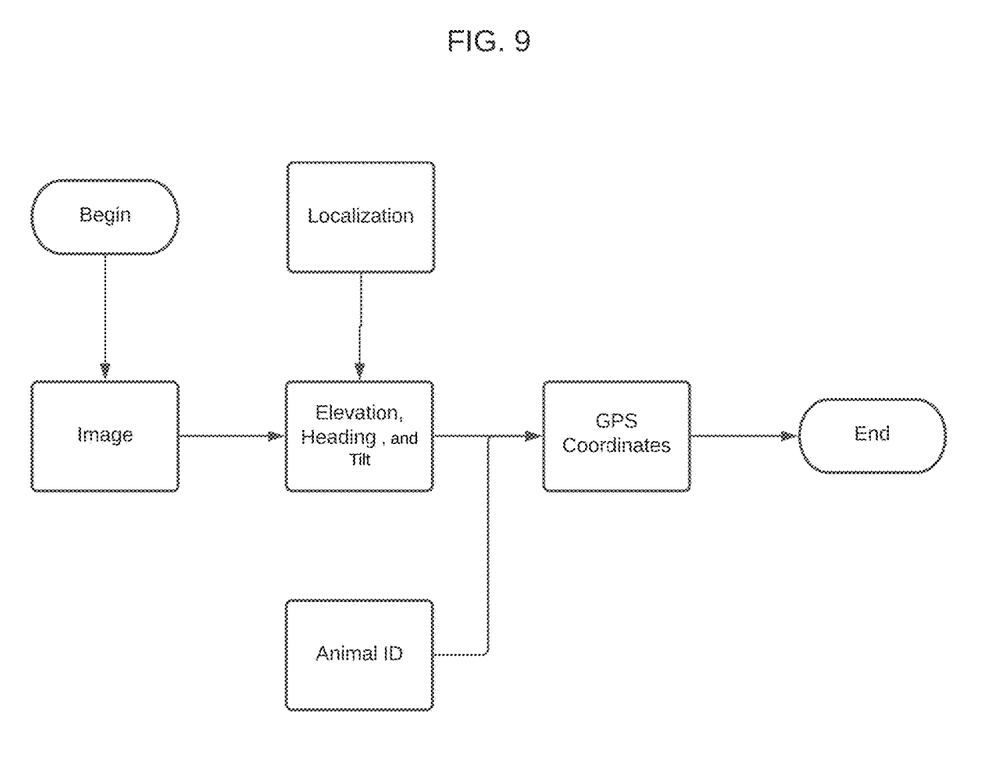
FIG. 9 illustrates the process used by the system's GPS registration module to determine the temporal variation in the GPS coordinates of a specified body parts for a competitors as it move around the race track and its motion is captured in the video's series of images.

The system's task of determining the temporal variation in the GPS coordinates of the specified body parts for each of the competitors, as they move around the race track, in the video's series of images is accomplished by its GPS registration module 50. The process used by this module is illustrated in FIG. 9.

Utilizing the output of the system's camera's calibration module (i.e., the camera's the extrinsics and intrinsics) and its competitor detection module (i.e., a competitor's location and orientation within each of the video's series of frame), in the system's GPS registration module we use the known GPS coordinates for the landmarks seen in the video's series of images to assign or map GPS or real-world coordinates to the specified body parts or key points on each of the competitors.

Figure 10:
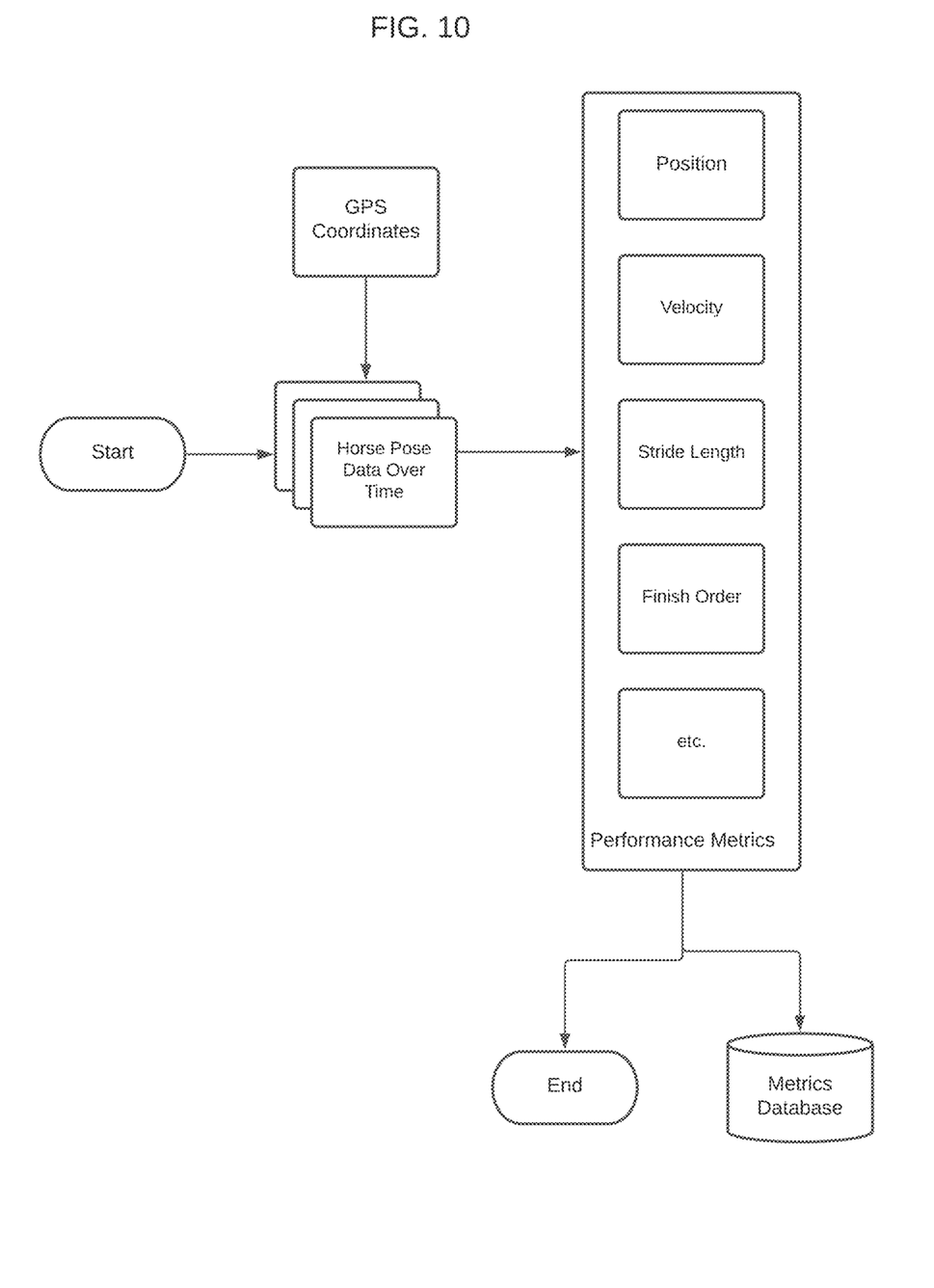
FIG. 10 illustrates the process used by the system's performance metrics module to determine the desired performance metrics for each of the racing competitors.

Finally, the system's task of determining the desired performance metrics for each of the competitors is accomplished by its performance metrics module 60. The process used by this module is illustrated in FIG. 10.

Since most of these performance metrics involve the analysis over time of the motion of a competitor, we use the camera's frame rate to determine the time lapses or durations between each of our video's series of images. With the output of the system's GPS registration module (e.g., the GPS coordinates of the specified body parts for a specific competitor in each of the video's series of images) and the camera's known frame rate, we are able to calculate the desired performance metrics for the competitor (e.g., velocity and acceleration at various times during a race).

For horse racing, the frame rate of the camera is also sufficiently high so that we are able to capture, between adjoining images or frames, a portion of a racehorse's stride.

Analyzing such adjoining images, we can determine the points where a specific hoof of the horse touches the track at the beginning and end of one of its strides. Knowing the GPS coordinates of such points, we determine the racehorse's stride length.

After this performance data has been generated, it is output in a structured manner that is then saved to a database for use on demand.

The foregoing is considered as illustrative only of the principles of the present invention. Further, since numerous modifications and changes will readily occur to those skilled in the art, it is not desired to limit the invention to the exact construction and operation shown and described herein. Accordingly, all suitable modifications and equivalents may be resorted to, falling within the scope of the invention that is hereafter set forth in the claims to the invention.

We claim:

1. A system for compiling a plurality of performance metrics for a plurality of racing competitors, by analyzing a plurality of videos, each recording a series of images taken over a series of instances, of a plurality of races of said competitors that were recorded with a camera, having a frame rate and a plurality of parameters that characterize the operation of said camera, and on a plurality of race tracks having a plurality of landmarks, each having a GPS coordinate, that appear in said videos of said races, said system comprising:

a race track initialization module configured to provide said images with a length scale by obtaining said GPS coordinates for each of said plurality of landmarks and storing said landmark GPS coordinates in a race track initialization database, a competitor detection module configured to use computer vision technology to detect within each of said series of images a position and an orientation for a part for each of said competitors, a camera calibration module configured to provide a frame by frame homography of said images to determine said parameters of said camera at each of said instances when each of said series of images were taken, a competitor tracking module configured to use Kalman filtering, and a probability prediction of where a competitor that is being tracked is likely to be positioned in a subsequent frame, to determine a path around said race track for each of said competitors, a GPS registration module configured to determine a plurality of GPS coordinates for said detected path for each of said competitors in each of said series of images, and a performance metrics module configured to use said determined plurality of GPS coordinates for each of said competitors and said frame rate of said camera to determine said performance metrics for each of said competitors.

2. The system as recited in claim 1, wherein:

said races each have a starting and a finish line and includes assigning, using computer vision technology, each of said plurality of competitors a starting position which serves to establish an identifying name and mark for each of said plurality of competitors.

3. The system as recited in claim 1, wherein:

said camera is a Pan-Tilt-Zoom (PTZ) camera situated at a fixed-location on said race track.

4. The system as recited in claim 2, wherein:

said camera is a Pan-Tilt-Zoom (PTZ) camera situated at a fixed-location on said race track.

5. The system as recited in claim 3, wherein:
said camera parameters are an extrinsic and intrinsic parameters for said PTZ camera.

6. The system as recited in claim 4, wherein:
said camera parameters are an extrinsic and intrinsic parameters for said PTZ camera.

7. The system as recited in claim 1, wherein:
said competitor detection module uses a trained neural network to detect said positions and orientations of said competitors.

8. The system as recited in claim 2, wherein:
said competitor detection module uses a trained neural network to detect said positions and orientations of said competitors.

9. The system as recited in claim 3, wherein:
said competitor detection module uses a trained neural network to detect said positions and orientations of said competitors.

10. The system as recited in claim 5, wherein:
said competitor detection module uses a trained neural network to detect said positions and orientations of said competitors.

11. A method for compiling a plurality of performance metrics for a plurality of racing competitors, by analyzing a plurality of videos, each recording a series of images taken over a series of instances, a plurality of races of said competitors that were recorded with a camera, having a frame rate and a plurality of parameters that characterize the operation of said camera, and on a plurality of race tracks having a plurality of landmarks, each having a GPS coordinate, that appear in said videos of said races, said method comprising the steps of:
providing said images with a length scale by obtaining said GPS coordinates for each of said plurality of landmarks and storing said landmark GPS coordinates in a race track initialization database,
utilizing computer vision technology to detecting within each of said series of images a position and an orientation for a part for each of said competitors,
providing a frame by frame homography of said images to determine said parameters of said camera at each of said instances when each of said series of images were taken,
utilizing Kalman filtering, and a probability prediction of where a competitor that is being tracked is likely to be positioned in a subsequent frame, to determine a path around said race track for each of said competitors,
determining a plurality of GPS coordinates for said detected path for each of said competitors in each of said series of images, and
utilizing said determined plurality of GPS coordinates for each of said competitors and said frame rate of said camera to determine said performance metrics for each of said competitors.

12. The method as recited in claim 11, wherein:
said races each have a starting and a finish line and includes assigning, using computer vision technology, each of said plurality of competitors a starting position which serves to establish an identifying name and mark for each of said plurality of competitors.

13. The method as recited in claim 11, wherein:
said camera is a Pan-Tilt-Zoom (PTZ) camera situated at a fixed-location on said race track.

14. The method as recited in claim 12, wherein:
said camera is a Pan-Tilt-Zoom (PTZ) camera situated at a fixed-location on said race track.

15. The method as recited in claim 13, wherein:
said camera parameters are an extrinsic and intrinsic parameters for said PTZ camera.

16. The method as recited in claim 14, wherein:
said camera parameters are an extrinsic and intrinsic parameters for said PTZ camera.

17. The method as recited in claim 11, wherein:
said step of detecting within each of said series of images a position and an orientation for a part for each of said competitors
entails using a trained neural network to detect said positions and orientations of said competitors.

18. The method as recited in claim 12, wherein:
said step of detecting within each of said series of images a position and an orientation for a part for each of said competitors
entails using a trained neural network to detect said positions and orientations of said competitors.

19. The method as recited in claim 13, wherein:
said step of detecting within each of said series of images a position and an orientation for a part for each of said competitors
entails using a trained neural network to detect said positions and orientations of said competitors.

20. The method as recited in claim 15, wherein:
said step of detecting within each of said series of images a position and an orientation for a part for each of said competitors
entails using a trained neural network to detect said positions and orientations of said competitors.

* * * * *